US009388795B1

(12) United States Patent
Choi et al.

(10) Patent No.: US 9,388,795 B1
(45) Date of Patent: *Jul. 12, 2016

(54) MAGNET CONFIGURATIONS FOR MAGNETIC LEVITATION OF WIND TURBINES AND OTHER APPARATUS

(71) Applicant: Regenedyne LLC, Sierra Vista, AZ (US)

(72) Inventors: Cheong S. Choi, Sierra Vista, AZ (US); Jenkins Michael Anthony, Phoenix, AZ (US)

(73) Assignee: Regenedyne LLC, Sierra Vista, AZ (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/322,750

(22) Filed: Jul. 2, 2014

Related U.S. Application Data

(60) Provisional application No. 61/843,030, filed on Jul. 4, 2013.

(51) Int. Cl.
*F03D 9/00* (2006.01)
*F03D 11/00* (2006.01)
*F03D 3/00* (2006.01)

(52) U.S. Cl.
CPC ............ *F03D 11/0008* (2013.01); *F03D 3/005* (2013.01); *F03D 9/002* (2013.01)

(58) Field of Classification Search
CPC ...... F03D 11/0008; F03D 9/002; F03D 3/005
See application file for complete search history.

(56) References Cited

U.S. PATENT DOCUMENTS

| 8,933,578 | B2 * | 1/2015 | Choi | F03D 9/002 290/44 |
| 2009/0322095 | A1 * | 12/2009 | Mazur | F03D 3/0418 290/55 |
| 2012/0139375 | A1 * | 6/2012 | Masuzawa | F16C 32/0465 310/90.5 |
| 2013/0277982 | A1 * | 10/2013 | Choi | F03D 9/002 290/55 |
| 2015/0167639 | A1 * | 6/2015 | Choi | F03D 9/002 290/55 |
| 2015/0226182 | A1 * | 8/2015 | Mazur | F03D 9/002 290/55 |
| 2015/0226184 | A1 * | 8/2015 | Mazur | F03D 1/005 415/1 |

* cited by examiner

*Primary Examiner* — Tulsidas C Patel
*Assistant Examiner* — Viet Nguyen
(74) *Attorney, Agent, or Firm* — Van Dyke Law; Raymond Van Dyke

(57) ABSTRACT

A wind turbine having one or more magnets for reducing friction between the turbine support and a turbine rotor. The reduction of friction between the turbine rotor and the turbine support allows for an increase in energy production and scale of the wind turbines. The magnet configuration employs a ring of cylindrically-shaped magnets at the bottom and opposed by a corresponding number of generally rectangular-shaped magnets. Bearing magnets are also employed for axial stabilization.

25 Claims, 8 Drawing Sheets

MAGNET CONFIGURATIONS FOR MAGNETIC LEVITATION OF WIND TURBINES AND OTHER APPARATUS

RELATED PATENT APPLICATION

The present application is a nonprovisional of U.S. Provisional Patent Application Ser. No. 61/843,030, filed Jul. 4, 2013, the disclosure of which is incorporated herein by reference.

BACKGROUND OF THE INVENTION

The capture of wind power and the translation of that power into energy have been a long-time human endeavor. From ancient windmills to the giant wind farms of today, the efficient capture and harnessing of this renewable energy is of paramount importance to modern economies. With the growing need for cleaner energies, the importance of advances in cleaner alternative energy production is manifest.

Wind turbines harness the kinetic energy of the wind and convert it into mechanical or electric power. Traditional wind turbines have a horizontal spinning axis that allowed blades of the wind turbine to rotate around the axis. As wind engages the blades, the blades move around the horizontal spinning axis of the wind turbine. The relative rotation of the blades to the horizontal axis may then be converted into energy.

Recently, vertical axis wind turbines have been used to harness the kinetic energy of the wind. Vertical axis wind turbines operate in the same manner as horizontal axis wind turbines; however, the axis is a vertical plane and the blades spin around the vertical axis. As is set forth in physics, particularly Betz' Law, during the operation of the horizontal axis and vertical axis wind turbines, energy is lost during the process as the mechanical pieces of the windmill lose energy to frictional forces. Further, the friction between the moving parts in existing systems creates maintenance problems, which require frequent and costly repairs, primarily due to the need for system downtime for such work.

More recently, magnetic levitation and other advances have been employed to reduce friction and otherwise increase the efficiencies of operation. Yet, the use of magnets for levitation, well known in the train industry, is fraught with problems. A chief problem in the usage of magnetic levitation is the control of the fluctuating magnetic fields, i.e., stability. This problem is further manifest in vertical axis wind turbine systems that attempt to levitate components to reduce friction, employing a single magnet around a center axis pole. These prior art systems, however, have not been able to stabilize the magnetic fluxes and also fail to eliminate friction, leaving the entire apparatus at risk.

There is, therefore, a need for an improved magnet configuration that increases stability, eliminates friction, and minimizes system service and downtime.

SUMMARY OF THE INVENTION

The present invention is directed to techniques, systems and methods to increase the efficiency of a wind turbine or like apparatus by reducing the friction occurring between the component parts of a wind turbine through a new magnet configuration. A wind turbine includes a turbine rotor, a turbine support, one or more blades coupled to the turbine rotor, where the one or more blades are configured to move the turbine rotor relative to the turbine support. Efficiency is improved by locating one or more magnet sets between the turbine support and the turbine rotor, creating a space therebetween. The rotational movement of the turbine rotor is essentially frictionless and minimal energy is expended during rotation of the turbine blades. The energy output produced by the turbine rotor is transmitted to one or more generators that are configured to generate electric power from the rotational movement of the turbine rotor.

In the instant invention, a set of dipolar magnets is coupled to a turbine rotor and a turbine support in a novel configuration. The set of dipolar magnets is used to create a space between the turbine rotor and turbine support, thereby reducing the friction force between the turbine rotor and the turbine support.

More particularly, the dipolar magnets are of two types, a lower magnet set of cylindrically-shaped magnets disposed in a ring about the turbine support, and an upper magnet set of generally rectangularly-shaped magnets, each disposed over a corresponding cylindrically-shaped lower magnet.

In this way, the entire apparatus employing the improved magnet configuration of the present invention controls the erratic magnetic fluxes and has enhanced stability of operation thereby. Additionally, axially-disposed alignment magnets may also be deployed to further stabilize the operation of the apparatus.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

Figure 1A:
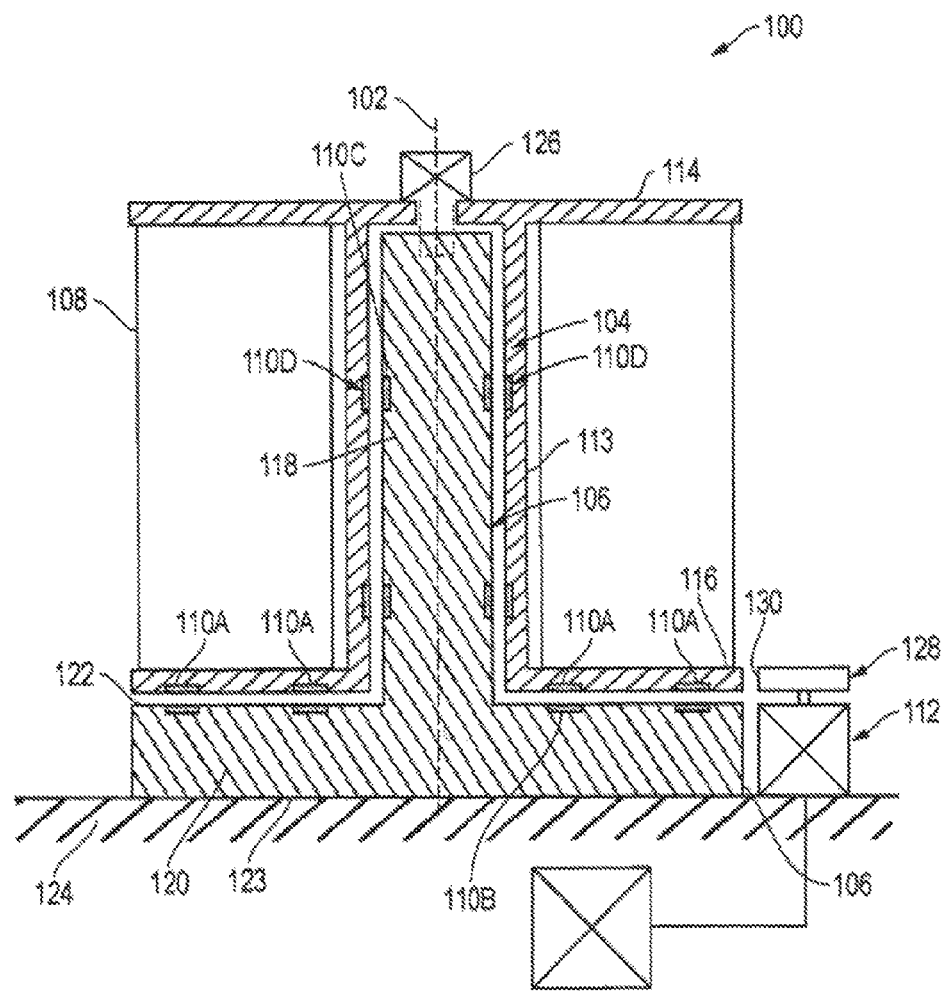
FIG. 1A is a schematic cross-sectional view of a prior art wind turbine configuration.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

With reference now to FIG. 1 of the DRAWINGS, there is illustrated therein a schematic cross sectional view of a wind turbine 100 that may be employed to implement the principles of the present invention. For example, such wind turbines are described in detail in U.S. patent application Ser. Nos. 12/215,232 and 12/215,233, cited as background to the instant invention, and the subject matters of both said applications are incorporated herein by reference.

As shown in FIG. 1, the wind turbine 100, as shown, is a vertical axis wind turbine. Therefore, a core axis 102 of the wind turbine 100 is substantially in a vertical plane relative to the Earth. The wind turbine 100 may have a turbine rotor 104 and a turbine support 106 within and concentric to the turbine rotor 104. The turbine rotor 104 rotates around the core axis 102 of the turbine support 106 in response to wind engaging one or more blades 108, shown schematically. The kinetic energy from the wind is captured by the blades 108 thereby rotating the turbine rotor 104. The turbine core support 106 may remain stationary as the turbine rotor 104 rotates around the axis 102. In order to reduce the effects of friction between the rotating turbine rotor 104 and the turbine support 106, magnet sets 110 are used to reduce the weight force of the turbine rotor 104 acting on the turbine support 106. A generator 112 may be located proximate the wind turbine 100 in order to convert the mechanical energy of the rotating turbine rotor 104 into electric power.

Figure 1B:
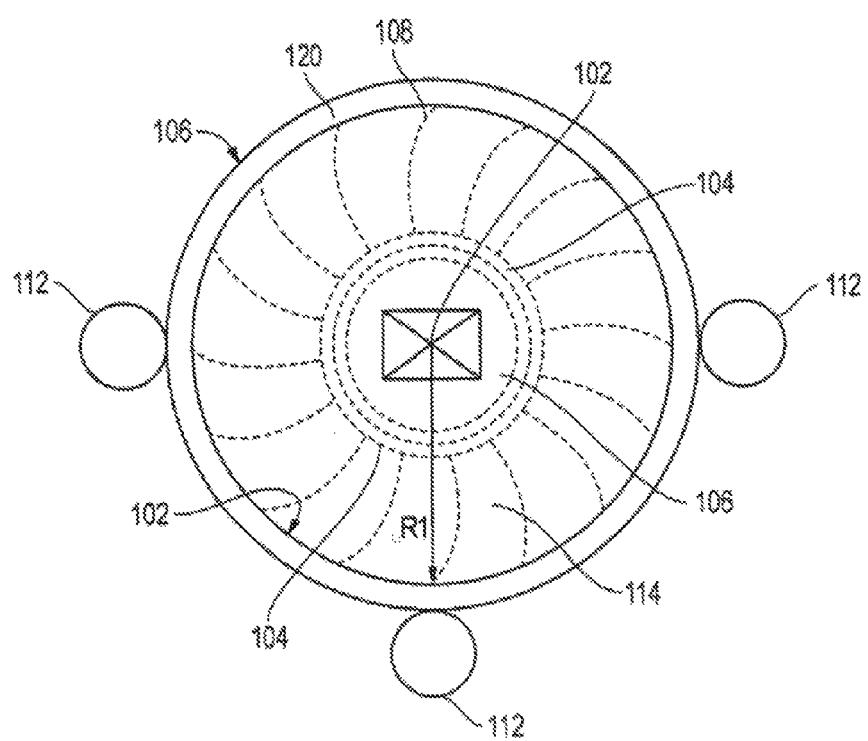
FIG. 1B is a schematic top view of a prior art wind turbine, such as the one in FIG. 1A.

The turbine rotor 104, as shown in FIG. 1A, has a central axis 113 that is substantially centered around the axis 102. The turbine rotor 104, may include a top 114 and a bottom 116 extending out from the central axis 113. As shown, the central axis 113 supports the top 114 and the bottom 116. The top 114 and/or the bottom 116, as shown, extend radially away from the central axis 113. In FIG. 1B a top view of the wind turbine 100 is shown. The top view shows the top 114 extending a first radius R1 away from the axis 102. The bottom 116 may extend the same distance as the top 114 from the axis 102; however, it should be appreciated that the distance the top 114 and bottom 116 extend from the axis 102 may vary depending on design conditions. The top 114, as shown in FIGS. 1A and 1B, extends over the top of a support shaft 118 of the turbine support 106; however, it should be appreciated that other suitable configurations for the top 114 may be used.

Figure 2:
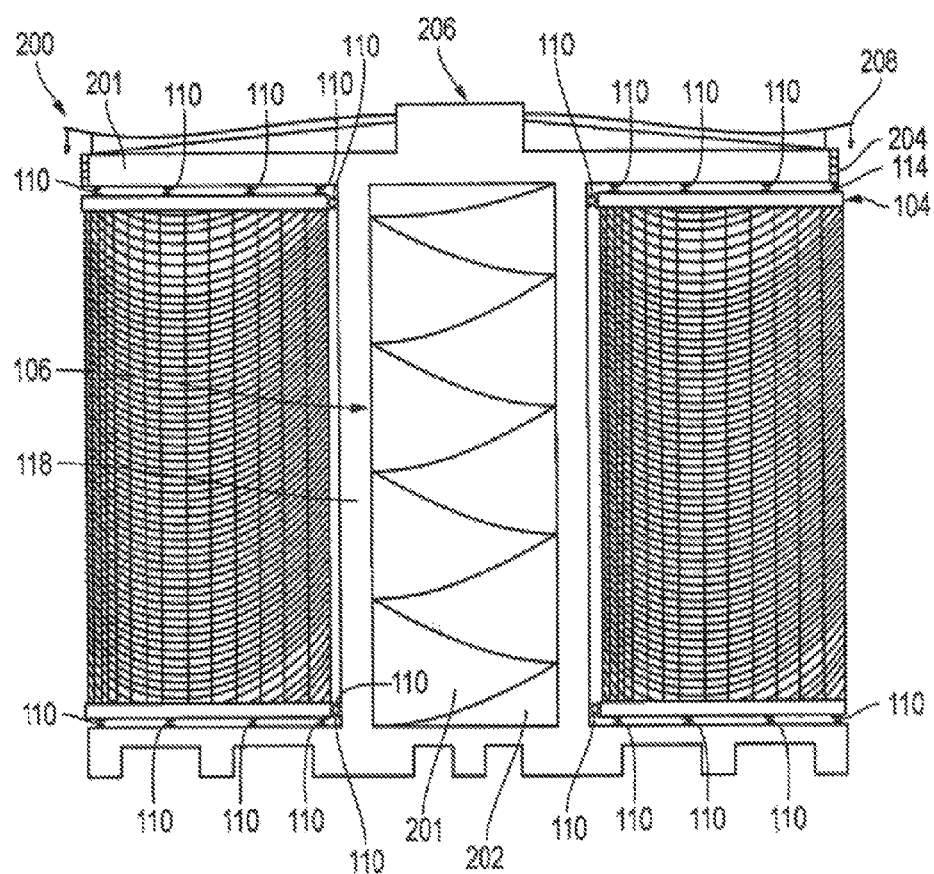
FIG. 2 is a schematic cross-sectional view of a prior art wind turbine.

It should be understood that the turbine rotor 104 may have alternative designs to the one shown in FIG. 1. For example, the turbine rotor 104 may not cover the top of the support shaft 118, as shown in FIG. 2. Further, the turbine rotor 104 may simply include the top 114 and the bottom 116 and be held together by the blades 108. Further still, the top 114 and/or the bottom 116 may not be shaped in a circular pattern, but instead may extend as supports over each of the blades 108 in an effort to save money on materials and reduce the weight of the turbine rotor 104. It should further be understood that the turbine rotor 104 may have any suitable design capable of supporting the blades 108 and rotating around the axis 102.

The bottom 116 of the turbine rotor 104 may include one or more of the magnets 110. The one or more magnets 110 located in the bottom 116 of the turbine rotor 104 provide an opposing force against one or more magnets 110 located on the turbine support 106. The opposing force created by the one or more magnets 110 reduces the weight load of the turbine rotor 106 on the turbine support 104, as will be discussed in more detail below in connection with FIGS. 5A, 5B and 5C.

The turbine support 106 may be any suitable shape capable of supporting the weight of the turbine rotor 104 and stabilizing the turbine rotor 104 as it rotates about the axis 102. The turbine support 106, as shown in FIG. 1A, includes a base 120 and the support shaft 118. The base 120 may rest under the bottom 116 of the turbine rotor 104. The base 120 typically acts as a support between a surface 124, such as the ground or bed rock, and the turbine rotor 104. The base 120 may include a platform 122 adjacent the turbine rotor 104 and a bottom member 123 adjacent the surface 124. The base 120 may be any suitable shape so long as the base is capable of supporting the weight of the turbine rotor 104.

Figure 3:
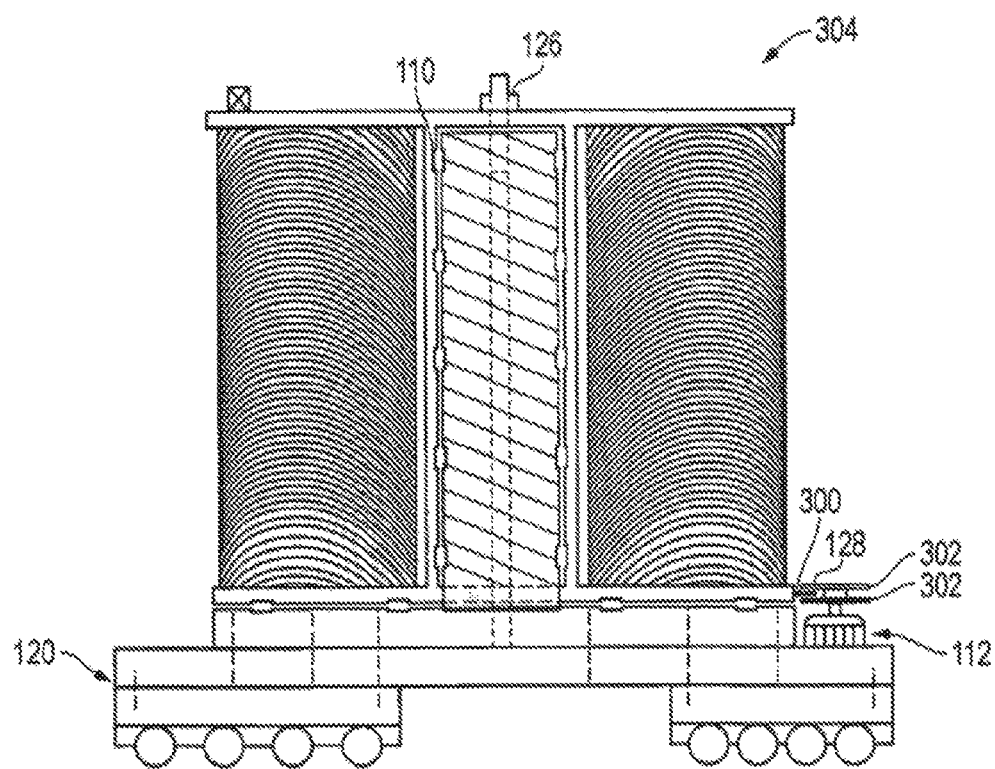
FIG. 3 is a schematic side view of another prior art wind turbine.

The surface 124, as shown in FIG. 1A, is the ground; however, it should be appreciated that the surface 124 may be any suitable surface for supporting the base 120 including, but not limited to, a trailer, a boat, a rail car as illustrated in FIG. 3, a top of a building, a top of a parking garage, a top of a stadium, offshore platforms, islands (man-made or otherwise) and the like.

The platform 122 typically provides the vertical support for the turbine rotor 104. The platform 122 may include one or more magnets 110A which provide an opposing force against the one or more magnets 110B located on the bottom 116 of the turbine rotor 104, as will be described in more detail below. The base 120 and/or the platform 122 may extend the same radial distance from the axis 102 as the turbine rotor 104. Alternatively, the base 120 may extend a shorter radial distance from the axis 102 than the turbine rotor 104, or, in another alternative embodiment, may extend a longer radial distance from the axis 102 than the turbine rotor 104. It should be appreciated that the platform 122 may be any suitable shape capable of providing a vertical support surface for the turbine rotor 104.

The support shaft 118 of the turbine support 106 may provide for stabilization of the turbine rotor 104. The support shaft 118, as shown in FIGS. 1A and 1B is located radially inside the central axis 113 of the turbine rotor 104. FIG. 1A shows the support shaft 118 as a substantially solid shaft which is slightly smaller than the interior of the central axis 113 of the turbine rotor 104. Alternatively, the support shaft 118 may define an opening that allows for an interior access way 202. The support shaft 118 allows the turbine rotor 104 to rotate in response to the wind while preventing the turbine rotor 104 from moving substantially in the direction perpendicular to the core axis 102. The support shaft 118 may include one or more magnets 110C which provide an opposing force against one or more magnets 110D located on the central axis 113 of the turbine rotor 104. The magnet 110C located on the support shaft 118 may act to axially stabilize the turbine rotor, as will be discussed in more detail below, for example, in connection with FIGS. 6A and 6B of the present invention.

The wind turbine 100 may include a connector 126, shown schematically in FIGS. 1A and 3. The connector 126 may secure the turbine rotor 104 to the turbine support 106 while allowing the turbine rotor 104 to rotate. FIG. 1A shows the connector 126 as a pin type connection which is secured to the support shaft 118 and penetrates an opening in the top 114 of the turbine rotor 104. A head of the pin may rest on the top 114 of the turbine rotor 104. The opening may be large enough to not engage the pin as the turbine rotor 104 rotates about the turbine support 106. The head may simply provide an upward travel limit for the turbine rotor 104. Thus, typically the turbine rotor 104 may not engage the connector 126; however, in the event that the turbine rotor 104 lifts off of the turbine support 106, the head will stop it from becoming detached from the wind turbine 100. It should be appreciated that any suitable arrangement for securing the turbine rotor 104 to the turbine support 106 may be used.

As described, one or more sets of magnets 110C, 110D reduce axial and other friction between the turbine support 104 and the turbine rotor 106 by creating a space between the turbine support 104 and the turbine rotor 106. The magnets replace the role of roller bearings in prior wind turbines. The magnet sets 110A, 110B positioned on the bottom 116 of the turbine rotor 104 and the platform 122 of the turbine support may include one or more levitation magnets and one or more stabilization magnets. The levitation magnets supply an opposing force between the bottom 116 of the turbine rotor 104 and the platform 122. The opposing force created by the levitation magnets may create a force on the turbine rotor 104 substantially opposite to a gravitational force on the turbine rotor 104. The levitation magnets can provide a large enough opposing force to lift the turbine rotor 104 off of the platform 122, thereby eliminating friction between the platform 122 and the turbine rotor 104. Specifically, a space may be created between the platform 122 and the bottom 116 of the turbine rotor 104 as a result of the opposing force. Alternatively, the opposing force created by the levitation magnets may only negate a portion of the gravitational force, so that the friction force between the platform 122 and the turbine rotor 104 is reduced. To overcome the stability and other problems of existing magnetic levitation systems, the present invention has an improved and novel configuration for the respective magnets 110A and 110B, as described further hereinbelow and illustrated in FIGS. 5A, 5B and 5C of the present invention.

The stabilization magnets 110D, 110C, as shown in FIG. 1A, are designed to provide an opposing force between the central axis 113 and the support shaft 118. The stabilization magnets may be located directly on the interior of the central axis 113 and the exterior of the support shaft 118. The stabilization magnets may maintain a space between the inner diameter of the central axis 113 and the outer diameter of the support shaft 118. Therefore, during rotation of the turbine rotor 104 there may be no friction between the central axis 113 of the turbine rotor 104 and the support shaft 118. It should be appreciated that other means of reducing the friction between central axis 113 and the support shaft 118 may be used including, but not limited to, a bearing. Further improvements in the technology of these bearing magnets are set forth hereinbelow in the instant invention, and illustrated in connection with FIGS. 6A and 6B.

Friction may be eliminated between the turbine rotor 104 and the turbine support 106 using both the levitation magnets and stabilization magnets. The one or more sets of magnets 110 may be any magnets suitable for creating an opposing force including but not limited to a permanent magnet, an electromagnet, permanent rare earth magnet, ferromagnetic materials, permanent magnet materials, magnet wires and the like. A permanent rare earth magnet may include samarium cobalt (SmCo) and/or neodymium (NdFEB). Further, the one or more magnets 110 may be arranged in any suitable manner so long as they reduce the friction between the turbine rotor 104 and the turbine support 106, although the improved configuration shown hereinbelow in connection with the present invention optimizes the friction losses.

FIGS. 1A, 2, and 3 show the magnet sets 110 as a series of permanent magnets spaced apart from one another; however, it should be appreciated that an electromagnet may be used in order to magnetize a portion of the turbine rotor 104 and the turbine support 106. Further, in an alternative embodiment, a portion of the turbine rotor 104 and the turbine support 106 may be magnetized to provide the opposing force. Thus in an alternative embodiment, the entire platform 122 and/or base 120 may be magnetized to provide an opposing force on the bottom 116 of the turbine rotor 104 which may also be magnetized.

The blades 108 may be any suitable blade capable of converting the kinetic energy of the wind into mechanical energy. In one embodiment, the blades 108 are made from a thin metal material, however, it should be appreciated that blades may be any suitable material including, but not limited to, a polycarbon, a fabric, a synthetic material.

The blades 108 may be fixed to the turbine rotor 104 in a static position. Alternatively, the blades 108 may be moveably attached to the turbine rotor 104. For example, a connection between the blades 108 and the turbine rotor 104 may allow the angle of the blades 108 to adjust in relation to the turbine rotor 104. The angle may adjust manually or automatically in response to the wind conditions at the location.

The turbine rotor 104 provides mechanical energy for the one or more generators 112 as the turbine rotor 104 rotates about the axis 102. In one embodiment, a generator gear 128 is moved by a portion of the turbine rotor 104 as the turbine rotor 104 rotates. As shown in FIG. 1A, an outer edge 130 of the gear 128 may be proximate an edge of the turbine rotor 104. In another embodiment, the gear 128 engages the turbine rotor 104 with a traditional gear and/or transmission device capable of transferring rotation to the gear 128.

In an additional or alternative embodiment, the gear 128 may be a magnetic gear. A magnetic gear is a gear that moves in response to a magnetic force between the turbine rotor 104 and the magnetic gear. At least one of the gear 128 and/or the proximate portion of the turbine rotor 104 may be magnetized. Thus, as the turbine rotor 104 rotates proximate the gear 128 the magnetic force moves the gear 128 in response to the turbine rotor 104 rotation. The magnetic gear allows the turbine rotor 104 to rotate the gear 128 without any friction between the two components.

With reference now to FIG. 3, there is illustrated a magnetic gear according to the prior art. A rotor gear component 300 may protrude from the outer surface of the turbine rotor 104. The rotor gear component 300 may extend beyond the outer diameter of the turbine rotor 103 and rotate with the turbine rotor 104. As shown, the rotor gear component 300 is a plate extending around an outer diameter of the turbine rotor 104; however, it should be appreciated that any suitable configuration for the rotor gear component 300 may be used. The gear 128 may include one or more gear wheels 302 which extend from the gear to a location proximate the rotor gear component 300. As shown in FIG. 3, there are two gear wheels 302 which are located above and below a portion of the rotor gear component 300. As the turbine rotor 104 rotates, the rotor gear component 300 rotates. A portion of the rotor gear component 300 may pass in between two portions of one or more gear wheels 302. Any of the rotor gear component 300, and the one or more gear wheels 302 may be magnetized. The type of magnet used to produce the magnetic force for the magnetic gear may be any magnet described herein. The magnetic force between the components of the magnetic gear move the gear 128 thereby generating electricity and/or power in the generator 112.

The generators 112 may be located at various locations proximate the turbine rotor 104. FIG. 1B shows three generators 112 located around the perimeter of the turbine rotor 104. It should be appreciated that any suitable number of generators 112 may be used around the perimeter of the turbine rotor 104. Further, the generator 112 may be located at other locations proximate the turbine rotor including, but not limited to, proximate the shaft 102 of the turbine rotor, in line with the axis 102 above and/or below the turbine rotor 104, and the like.

The generator 112 may be any suitable generator for converting mechanical energy into power including, but not limited to, electric generators, motors, linear generators, and the like. In one embodiment, one or more of the generators 112 is a linear synchronous motor (LSM). The LSM motor may advance the turbine support 120 and may double as a braking system.

The power generated by the generator may be fed directly to a power grid. Further, it should be appreciated that the power may alternatively or additionally be used on site or stored. The stored power may be used at a later date when demand for the power is higher. Examples of power storage units include, but are not limited to, batteries and generating stored compressed air, a flywheel system, a magnetically levitated flywheel system, hydraulic accumulators, capacitors, super capacitors, a combination thereof, and the like.

The magnet sets 110 reduce and potentially eliminate friction between the turbine rotor 104 and the turbine support 106. This friction reduction allows the scale of the wind turbine 100 to be much larger than a conventional wind turbine. In a conventional wind turbine the larger the wind turbine, the more friction is created between the moving parts. The amount of friction eventually limits the effective size of a conventional wind turbine. In one example, the wind turbine may have an outer diameter of 1000 ft. Known wind turbines prior to this invention typically have diameters of up to approximately 300 ft. In another aspect, a fixed wind turbine 200, as shown in FIG. 2, has an outer diameter of about 600 ft. and is capable of producing more than 1 GW of power. A smaller portable wind turbine 304, shown in FIG. 3, may be adapted to transport to remote locations. The portable version may have a diameter of greater than 15 ft. and a height of greater than 15 ft. In a preferred embodiment, the portable version has an outer diameter within a range of about 30 ft. to 120 ft. and a height within a range of about 25 ft. to 100 ft. and is capable of producing 50 MWh of power. It should be appreciated that the size and scale of the wind turbine may vary depending on a customers need. Further, it should be appreciated that more than one wind turbine may be located on the same portable transports system, and/or at one fixed location.

Although, the overall size of the wind turbine 100 may be much larger than a traditional wind turbine, the amount of power one wind turbine 100 produces is much larger than a traditional wind turbine. Therefore, the total land use required for the wind turbine 100 may be reduced over that required for a traditional wind farm.

The prior art configuration shown in FIG. 2 shows a fixed wind turbine 200, which may have a turbine support 106 extending over the turbine rotor 104. The magnet sets 110 may be on an upper portion 201 of the turbine support 106 in addition to the locations described above.

The fixed wind turbine 200 may include an interior access way 202, according to one embodiment. It should be appreciated that any of the wind turbines 100, 200 and 304 may include an interior access way 202. The interior access way 202 allows a person to access the interior of the turbine support 104. The interior access way 202 may extend above and/or below the turbine rotor 104 in order to give the person access to various locations in the fixed wind turbine 200. The interior access way 202 may allow a person to perform maintenance on the magnets 110 and other components of the wind turbine 100, 200, and 304. Further, the interior access way 202 may have a means for transporting persons up and down the interior access way 202. The means for transporting persons may be any suitable item including, but not limited to, an elevator, a cable elevator, a hydraulic elevator, a magnetic elevator, a stair, a spiral staircase, an escalator, a ladder, a rope, a fireman pole, a spiral elevator, and the like. The spiral elevator is an elevator that transports one or more persons up and down the interior access way 202 in a spiral fashion around the interior of the interior access way 202. For example, the spiral elevator may travel in a similar path to a spiral staircase. The elevator and/or spiral elevator may use magnetic levitation to lift the elevator up and down.

The upper portion 201 of the turbine support 106 may include an observation deck 204. The observation deck 204 may extend around the perimeter of the wind turbine 100, 200 and/or 304, thereby allowing a person to view the surrounding area from the observation deck 204. The observation deck 204 may also serve as a location for an operator to control various features of the wind turbine, as will be discussed in more detail hereinbelow.

The upper portion 201 of the turbine support 106 may further include a helipad 206. The helipad 202 allows persons to fly to the wind turbine 100, 200, and/or 304 and land a helicopter (not shown) directly on the wind turbine. This may be particularly useful in remote locations or locations with limited access including, but not limited to, the ocean, a lake, a industrial area, a tundra, a desert, and the like.

The upper portion 201 of the turbine support 106 may further have one or more cranes 208. The cranes 208 allow an operator to lift heavy equipment. The crane 208 may be a tandem crane capable of rotating around the diameter of the wind turbine. The crane may assist in the construction of the wind turbine 100.

Figure 4:
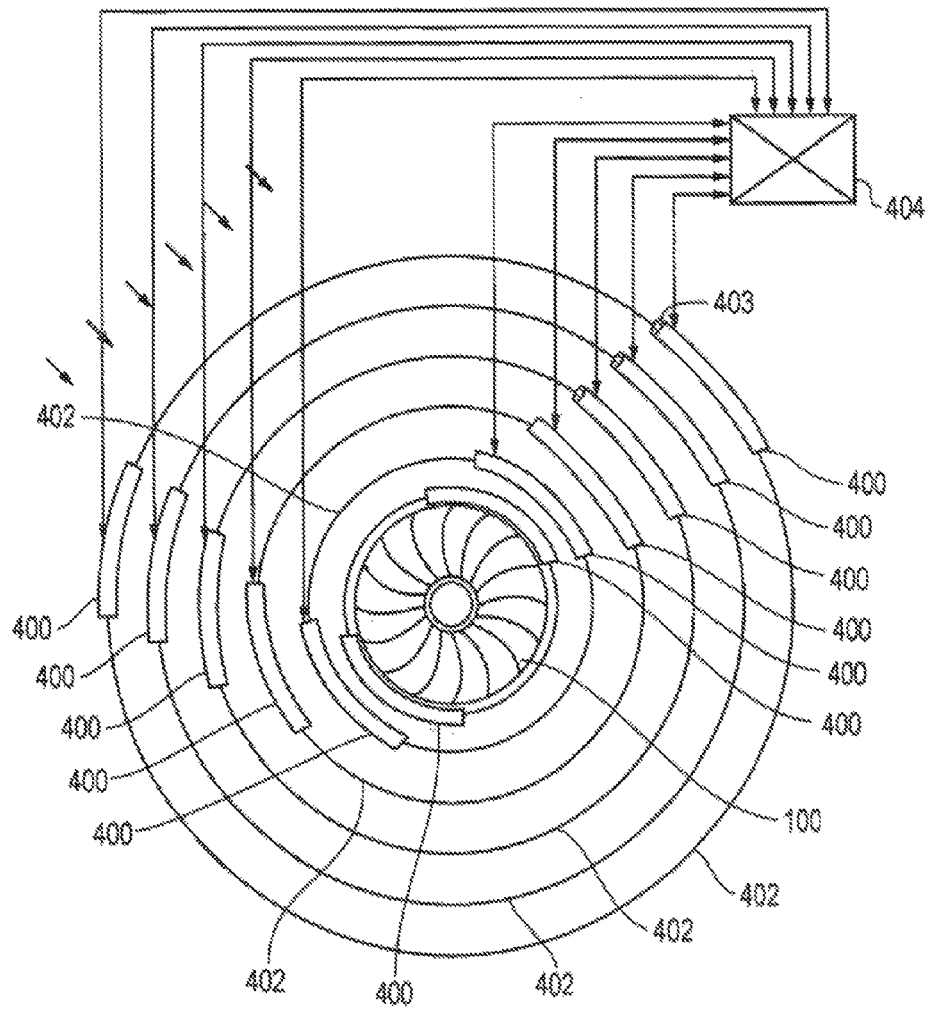
FIG. 4 is a schematic top view of a wind turbine of the prior art.

With reference now to FIG. 4 of the DRAWINGS, there is illustrated therein a top view of the prior art wind turbine 100 in conjunction with one or more wind compressors 400. The wind compressors 400 are each an obstruction configured to channel the wind toward the wind turbine 100. As generally illustrated in FIG. 4, the wind compressor 400 is positioned on either side of the wind turbine 100 so as to redirect the flow of wind towards the wind turbine 100. The wind compressor 400 funnels the wind into the wind turbine 100. The convergence of the winds towards the wind turbine 100 creates a Venturi effect thereby increasing the speed and force of the winds upon the wind turbine 100. This Venturi effect on the wind turbines increases the rpms or rotation speed of the rotors which translates into increased electrical energy produced by the generators 112 (FIG. 1A). This increase in wind energy and force upon the turbine blades 108 is thus translated from the wind turbine 100 to the generator 112 resulting in an increased output of electricity. This obstruction 400 increases the efficiency and ultimate output of the wind turbine 100, 500 up to, beyond 1000-2000 megawatts (MW) per hour or 1 gigawatt (GW) per hour. Known wind turbines produce between 2-4 MGW/hour. It should be understood that to generate GW range output, e.g., at 14 m/s wind speed at sea level, a 3,700 ft×3,700 ft. wind swept area is required (for 1 GW) and a 5,200 ft by 5,200 ft. wind swept area is required (for 2 GW).

The wind compressor 400 may be any suitable obstruction capable of re-channeling the natural flow of wind towards the wind turbine(s) 100. Suitable wind compressors include, but are not limited to, a sail, a railroad car, a trailer truck body, a structure, and the like. Structurally the obstructions 400 are of such a shape and size to capture and redirect a body of wind towards the wind turbine. In one embodiment an obstruction, such as a sail having a large area in two dimensions, but is basically a flat object, must be anchored to avoid displacement by the force of the wind. Other obstructions, such as the rail road car or trailer truck, should have enough weight to avoid wind displacement. Other obstruction shapes in sail or airfoil design are possible, and are set forth in other applications of Applicant.

Each of the wind compressors 400 may be moveably coupled to a transporter 403, or transport device to move the compressor 400 to a location or position that captures the wind flow as the direction of wind changes and directs the wind flow towards the wind turbine. The transporter may be any suitable transporter 403 capable of moving the wind compressor 400 including, but not limited to, a locomotive to move a rail car, a automobile, a truck, a trailer, a boat, a Sino trailer, a heavy duty self propelled modular transporter 403 and the like. Each of the transporters 403 may include an engine or motor capable of propelling the transporter 403. The location of each of the wind compressors 400 may be adjusted to suit the prevailing wind pattern at a particular location. Further, the location of the wind compressors 400 may be automatically and/or manually changed to suit shifts in the wind direction. To that end, the transporter 403 may include a drive member for moving the transporter 403. The transporter 403 may be in communication with a controller, for manipulating the location of each of the transporters 403 in response to the wind direction. A separate controller may be located within each of the transporters 403.

One or more pathways 402, shown in FIG. 4, may guide transporters 403 as they carry the wind compressors 400 to a new location around the wind turbine 100. The one or more pathways 402 may be any suitable pathway for guiding the transporters including, but not limited to, a railroad, a monorail, a roadway, a waterway, and the like. As shown in FIG. 4, the one or more pathways 402 are a series of increasingly larger circles which extend around the entire wind turbine 100. It should be appreciated that any suitable configuration for the pathways 402 may be used. As described above, the size of the wind turbine 100 may be greatly increased due to the minimized friction between the turbine rotor 104 and the turbine support 106. Thus, the pathways 402 may encompass a large area around the wind turbine 100. The wind compressors 400 as a group may extend out any distance from the wind turbine 100, only limited by the land use in the area. Thus, a large area of wind may be channeled directly toward the wind turbine 100 thereby increasing the amount of wind engaging the blades 108.

In one aspect, the controller may be a single controller 404 capable of controlling each of the transporters 403 from an onsite or remote location. The controller(s) 404 may be in wired or wireless communication with the transporters 403. The controller(s) 404 may initiate an actuator thereby controlling the engine, motor or drive member of the transporter 403. The controller(s) may comprise a central processing unit (CPU), support circuits and memory. The CPU may comprise a general processing computer, microprocessor, or digital signal processor of a type that is used for signal processing. The support circuits may comprise well known circuits such as cache, clock circuits, power supplies, input/output circuits, and the like. The memory may comprise read only memory, random access memory, disk drive memory, removable storage and other forms of digital memory in various combinations. The memory stores control software and signal processing software. The control software is generally used to provide control of the systems of the wind turbine including the location of the transporters 403, the blade direction, the amount of power being stored versus sent to the power grid, and the like. The processor may be capable of calculating the optimal location of each of the wind compressors based on data from the sensors.

One or more sensors 310, shown in FIG. 3, may be located on the wind turbines 100, 200, and/or 304 and/or in the area surrounding the wind turbines. The sensors 310 may detect the current wind direction and/or strength and send the information to a controller. The sensors 310 may also detect the speed of rotation of the turbine rotor 104. The controller may receive information regarding any of the components and/or sensors associated with the wind turbines. The controller may then send instructions to various components of the wind turbines, the wind compressors and/or the generators in order to optimize the efficiency of the wind turbines. The controller may be located inside the base of the tower, at the concrete foundation, a remote location, or in the control room at the top of the tower.

As described, FIGS. 1-4 set forth components of a turbine system which may be employed in the present invention. Turning now to the description of the present invention, it should be understood that wherever applicable the text hereinabove may be employed to exemplify some aspects of the innovations set forth herein and claimed hereinbelow.

Figure 5A:
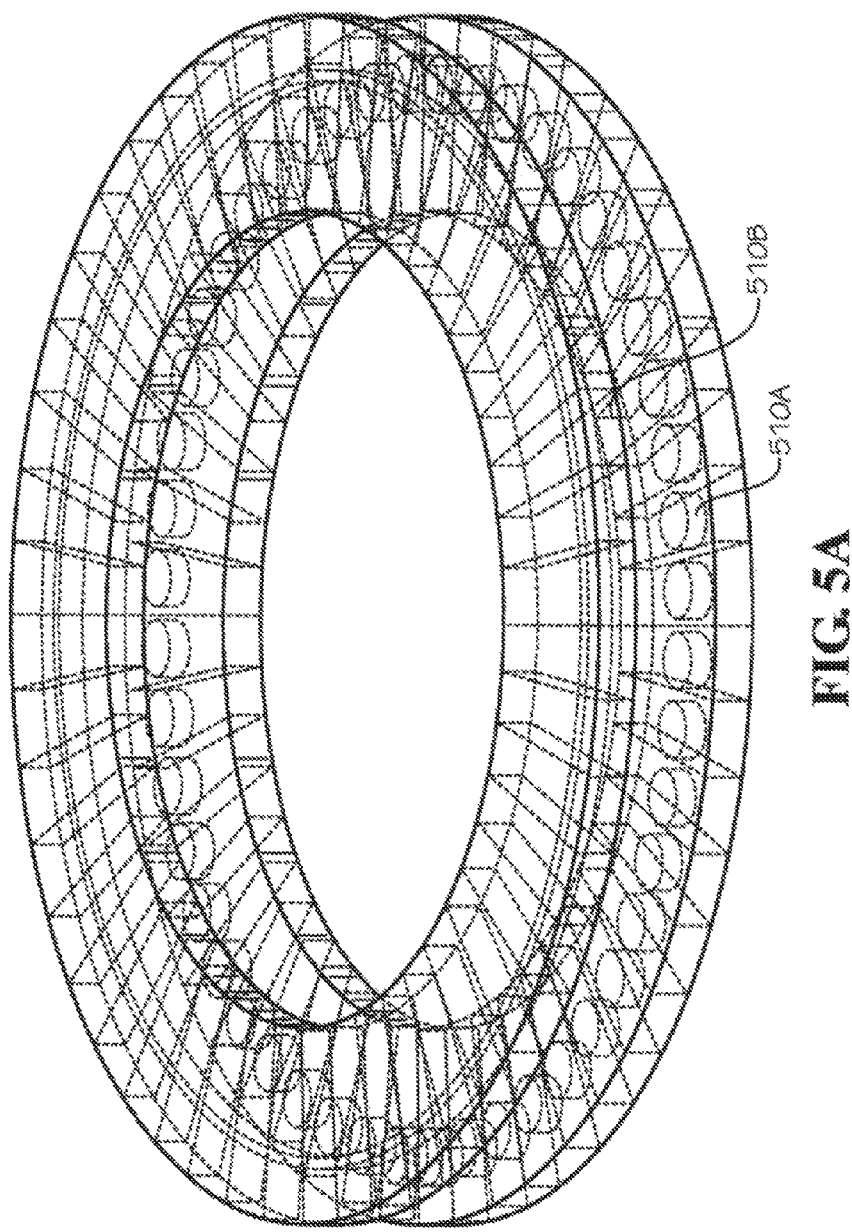
FIG. 5A is an outline view of a ring configuration of magnets in an embodiment according to the present invention.
Figure 5B:
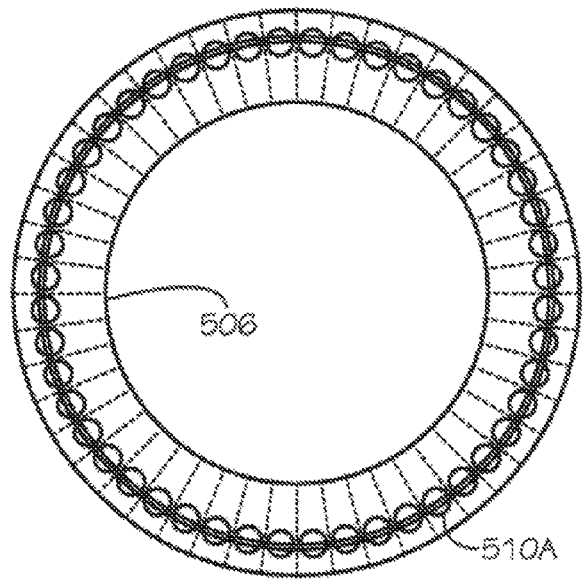
FIG. 5B is a top view a ring configuration of magnets in an embodiment according to the present invention.
Figure 5C:
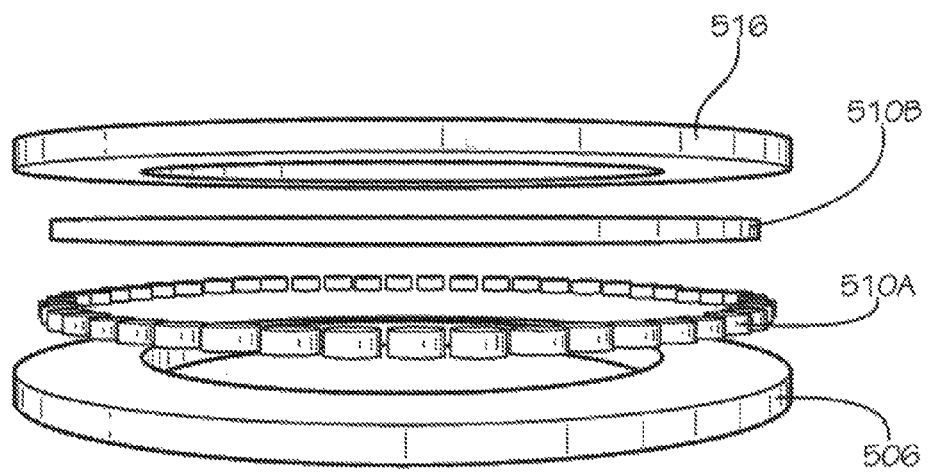
FIG. 5C is an elevational side views of a ring configuration of magnets in an embodiment according to the present invention.

With reference now to FIG. 5A of the DRAWINGS, directed to the present invention, there is shown a portion of the wind turbine apparatus, i.e., a ring-shaped configuration thereof, generally designated in the figures by the reference numeral 530 that may be deployed in the various contexts set forth in FIGS. 1-4 as described in the text hereinabove. Shown in outline in FIG. 5A are a number of cylindrical magnets, generally designated by the reference numeral 510A, disposed in a ring or circle, as also shown in FIG. 5B, and onto a disc or support. An exploded view of the components of the ring-shaped configuration 530 is shown in FIG. 5C, of which FIG. 5B is a cross-sectional view.

The cylindrical magnets 510A are disposed at a fixed radius and affixed to a base support plate 506 by strong glue or other secure affixation to a turbine support, such as turbine 106 described hereinabove. The magnets are preferably made of neodymium, e.g., NDFeB Grade N52, and in one embodiment of the present invention, have a dimension of about 1.5 inch diameter by 0.75 inch thickness or height. The cylinder magnets 510A are axially polarized, i.e., the poles of the magnet are on the flat ends. The magnets preferably are quite strong also, e.g., with a pull force of more than 115 pounds, a 5,233 Gauss surface field, and a maximum operating temperature of 176 degrees F./80 degrees Celsius. Applicant has found that the ring configuration of the magnets 510A produce a strong field, when the positive pole faces upwards, to oppose the corresponding magnets in the rotor portion, described hereinbelow. Applicant, by using magnetic field viewing film and Ferro fluid, uncovered the above configuration as best able to manage the fluctuating magnetic forces. Of course, minor adjustments to Applicant's discovery are possible and deemed within the contours of the present invention, particularly as claimed.

Figure 6A:
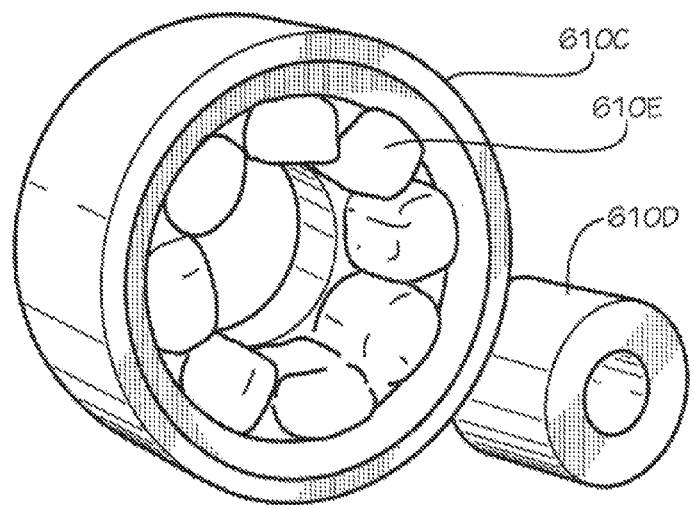
FIG. 6A is a perspective view of an embodiment of a magnetic bearing configuration according the present invention.

With reference again to FIGS. 5A-5C of the present invention, disposed above the ring of magnets 510A in the ring-shaped configuration 300, are a band of generally rectangular-shaped magnets 510B disposed on the bottom surface of a base rotor plate 516, which is affixed to the bottom of a rotor, such as rotor 104 described hereinabove. As shown in the figures, the magnets 510B are each substantially aligned or aligned over a respective cylindrical magnet 510A. To provide the lift against gravity, the lower magnets 510A are generally 30-40% greater in strength than the upper magnets 510B. Applicant has discovered that this particular configuration of cylindrical and rectangular magnetic pairs displays enhanced capabilities, providing strong perimeter support not found in any of the prior art. As noted, many prior art techniques rely on a single magnet disposed along a central shaft or pole of the apparatus, and not along the perimeter. As such, the prior art configurations are inherently less balanced and much more susceptible to stabilization problems and cause more friction. The configuration of the present invention overcomes these shortcomings, and is an improvement over the technologies shown in FIGS. 1-4 and in U.S. patent application Ser. Nos. 12/215,232 and 12/215,233 incorporated herein by reference With reference now to FIGS. 6A and 6B of the DRAWINGS, there are shown magnetic bearing configurations that may be employed in the present invention to provide additional axial support. As shown in FIG. 6A, a rotor bearing 610C, which is disposed about a support shaft 118 or a magnet bearing 610D a part thereof, is magnetically opposed to the bearing 610D, maintaining a gap or space therebetween, thereby reducing friction. As shown, rotor bearing 610C has a number of respective magnets radially-aligned along the inside surface, for example, eight, generally designated by the reference numeral 610E. It should, of course, be understood that other configurations and numbers of these radially-aligned magnets are possible than the one shown. As noted above, the positive poles of the rotor bearing 610C (actually the respective magnets 610E aligned therein) and 610D are disposed toward the other, thereby generating repulsive forces to keep the components apart. As noted above in connection with FIG. 1, a number of these bearing pairs 610C and 610D can be placed along the length of the support shaft 118. Alternatively, one pair can be placed at the bottom, e.g., along the base rotor plate 516, for example, and another at the top of the rotor or near the top of the support shaft 118.

Figure 6B:
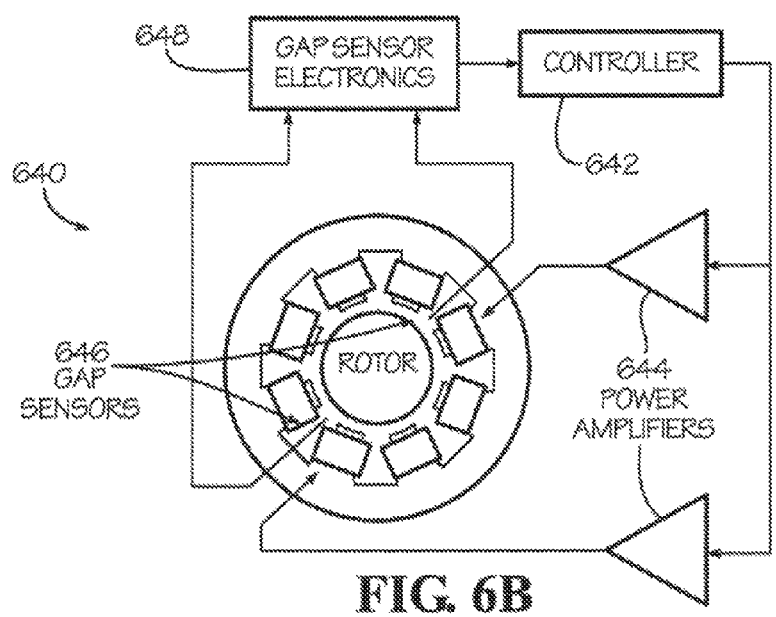
FIG. 6B is a schematic illustration of the magnet and electronic components within the magnetic bearing shown in FIG. 6A.

With reference to FIG. 6B, the above magnet configuration can be equipped with electronics to better maintain the gap distance. A stabilizer system, generally designated by the reference numeral 640, includes a controller 642, power amplifiers 644, gap sensors 646 to gauge the distance of the gap (the distance between the shaft/bearing 610D and the rotor bearing 610C) and a gap sensor detector 648. If the overall apparatus is unaligned, e.g., the support shaft 118 moves out of vertical alignment, and a bigger gap opens along one side, with a corresponding smaller gap on the opposite side, the controller 642 instructs the power amplifiers 644 to create more force along the smaller gap side (or less along the greater gap side) to compensate and correct the generally vertical alignment of the apparatus.

It should be understood that the configuration of components set forth herein, particularly in FIGS. 5 and 6, are described in connection with wind turbines, the principles are applicable in other contexts as well. Indeed, the particular alignments of magnets uncovered in the instant case have applicability in numerous other contexts that employ turbines or more generally, generators, such as, but not limited to, the aforementioned electric generators, motors, linear generators and the like. The improved balance and stabilization set forth in the instant application can thus be made manifest in any generator or like apparatus where frictionless operations are desired. Indeed, the innovative perimeter balance, as well as axial balance, have the capability to improve the operation of many devices, whether or not in the field of alternative energy.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A wind turbine, comprising:
 a turbine rotor;
 a turbine support;
 one or more blades coupled to the turbine rotor, the one or more blades configured to move the turbine rotor relative to the turbine support;
 a magnet set located between the turbine support and the turbine rotor, where a lower set of magnets have a generally cylindrical shape and disposed in a ring about the turbine support, and an upper set of magnets having a generally rectangular shape,
 each of said rectangular-shaped magnets substantially aligned above a respective cylindrically-shaped magnet;
 a space defined between at least a portion of the turbine rotor and a portion of the turbine support, wherein the space is created by the magnet set; and
 one or more generators configure to generate electric power from the movement of the turbine rotor.

2. The wind turbine according to claim 1, wherein the turbine support further comprises a support shaft and a base.

3. The wind turbine according to claim 2, wherein the base further comprises a platform located substantially under a bottom of the turbine rotor.

4. The wind turbine according to claim 2, further comprising one or more stabilization magnet sets, wherein the one or more stabilization magnet sets are configured to form a space between the support shaft and the turbine rotor.

5. The wind turbine according to claim 1, wherein the cylinder magnets are about 1.5 inch in diameter and about 0.75 inches in height.

6. The wind turbine according to claim 1, wherein the one or more generators further comprises:
 a generator gear; and
 a turbine gear, wherein the turbine gear is configured to move the generator gear.

7. The wind turbine according to claim 6, further comprising a magnetic gear connection between the generator gear and the turbine gear, wherein the magnetic gear connection is configured to move the generator gear without friction between the turbine gear and the generator gear.

8. The wind turbine according to claim 1, wherein the one or more generators further comprises at least one linear synchronous generator.

9. The wind turbine according to claim 1, wherein the turbine rotor further comprises:
 a central axis;
 a bottom; and
 a top, wherein the bottom and the top extend substantially radially away from the central axis.

10. The wind turbine according to claim 9, wherein the one or more blades further comprise a poly-carbon material and extend substantially between the top and the bottom of the turbine rotor.

11. A wind turbine, comprising:
 a turbine rotor;
 a turbine support;
 one or more blades coupled to the turbine rotor, the one or more blades configured to move the turbine rotor relative to the turbine support in response to wind engaging the one or more blades;

a magnet set located between the turbine support and the turbine rotor, where a lower set of magnets have a generally cylindrical shape and disposed in a ring about the turbine support, and an upper set of magnets having a generally rectangular shape,
   each of said rectangular-shaped magnets aligned above a respective cylindrically-shaped magnet; and
   one or more generators configured to generate electric power in response to the relative movement between the turbine rotor and the turbine support frame.

12. The wind turbine according to claim 11, wherein the turbine support further comprises:
   a base located below the turbine rotor;
   a support shaft located along a central axis of the turbine rotor; and
   a top configured to cover a substantial portion of the turbine rotor and the one or more blades.

13. The wind turbine according to claim 12, wherein the top further comprises an observation deck for one or more persons to access.

14. The wind turbine according to claim 12, wherein the support shaft further comprises an interior access way configured to allow the one or more persons to travel to and from the observation deck.

15. The wind turbine according to claim 14, wherein the interior access way further comprises an elevator.

16. The wind turbine according to claim 11, further comprising a transport device located beneath the turbine support and configured to move the wind turbine to and from remote sites.

17. The wind turbine according to claim 16, wherein the transport device is a trailer.

18. The wind turbine according to claim 11, wherein the one or more magnet sets are permanent magnets.

19. A method for generating electricity, comprising:
   lifting a vertical turbine rotor off of a turbine support using one or more sets of magnets, thereby reducing the friction between the vertical turbine rotor and the turbine support;
   engaging one or more blades coupled to the vertical turbine rotor with wind;
   rotating the vertical turbine rotor relative to the turbine support as the one or more blades engage the wind; and
   converting the mechanical energy of the moving vertical turbine rotor into electric power using a generator,
   wherein said one or more sets of magnets in opposition include a lower set of magnets having a generally cylindrical shape and disposed in a ring about and affixed to the turbine support, and an upper set of magnets having a generally rectangular shape and affixed to said turbine rotor.

20. The method according to claim 19, further comprising using the one or more sets of magnet to create a space between the vertical turbine rotor and the turbine support.

21. The method according to claim 19, further comprising:
   rotating a turbine gear mechanically coupled to the vertical turbine rotor proximate a generator gear mechanically coupled to the generator; and
   rotating the generator gear.

22. The method according to claim 21, wherein moving the generator gear further comprises engaging the generator gear with a magnetic force between the turbine gear and the generator gear.

23. A method for generating electricity, comprising:
   coupling a set of dipolar magnets to a turbine rotor and a turbine support;
   reducing a friction force between the turbine rotor and the turbine support when using the set of dipolar magnets to create a space between the turbine rotor and turbine support; and
   converting the mechanical energy of the moving turbine rotor into electric power using a generator,
   wherein said set of dipolar magnets include a lower set of magnets having a generally cylindrical shape and disposed in a ring about and affixed to the turbine support, and an upper set of magnets having a generally rectangular shape and affixed to said turbine rotor, said lower and upper sets of said dipolar magnets being in opposition.

24. The method according to claim 23, further comprising rotating a generator gear using a magnetic force between a turbine gear and the generator gear.

25. A vertical wind turbine, comprising:
   a turbine rotor, the turbine rotor comprises:
      a central axis;
      a top; and
      a bottom, wherein the top and the bottom extend radially away from the central axis;
   a turbine support, the turbine support comprises:
      a support shaft located within the central axis; and
      a base, the base further comprises a platform located substantially under the bottom of the turbine rotor;
   stabilization magnets located between an exterior of the support shaft and an interior of the central axis, the stabilization magnets configured to maintain a space between the support shaft and the central axis;
   a levitation magnet set located between the platform and the bottom of the turbine rotor, where a lower set of magnets have a generally cylindrical shape and disposed in a ring about the turbine support, and an upper set of magnets having a generally rectangular shape, each of said rectangularly-shaped magnets aligned above a respective cylindrically-shaped magnet,
   the levitation magnet set creating a magnetic field to lift the turbine rotor off of the platform in order to reduce friction between the turbine rotor and the turbine support;
   one or more blades coupled to the turbine rotor, the one or more blades configured to move the turbine rotor relative to the turbine support; and
   a generator configured to convert mechanical power of the moving turbine rotor into electric power.

* * * * *